US012723962B2

(12) United States Patent
Rojas et al.

(10) Patent No.: US 12,723,962 B2
(45) Date of Patent: Sep. 1, 2026

(54) DEVICE INSPECTION APPARATUS FOR DETERMINING CLEANING NECESSITY AND RELATED METHODS

(71) Applicant: DISH Network L.L.C., Englewood, CO (US)

(72) Inventors: Angel Rojas, El Paso, TX (US); Sean Pichardo, El Paso, TX (US); Joel Cardoso, El Paso, TX (US); Humberto Bolanos, Socorro, TX (US); Gerardo Moreno, El Paso, TX (US); Javier Acosta, El Paso, TX (US); Hector Valdez, El Paso, TX (US)

(73) Assignee: DISH Network L.L.C., Englewood, CO (US)

( * ) Notice: Subject to any disclaimer, the term of this patent is extended or adjusted under 35 U.S.C. 154(b) by 295 days.

(21) Appl. No.: 18/366,910

(22) Filed: Aug. 8, 2023

(65) Prior Publication Data

US 2025/0052660 A1 Feb. 13, 2025

(51) Int. Cl.

| | |
|---|---|
| ***G01N 15/06*** | (2024.01) |
| *G01N 1/10* | (2006.01) |
| *G01N 15/00* | (2006.01) |
| *G01N 15/02* | (2006.01) |

(52) U.S. Cl.

CPC ..... *G01N 15/06* (2013.01); *G01N 2001/1006* (2013.01); *G01N 2015/0046* (2013.01); *G01N 15/02* (2013.01)

(58) Field of Classification Search

CPC .................. G01N 15/06; G01N 15/02; G01N 2001/1006; G01N 2015/0046; G01N 1/2273; G01N 2001/028; G01N 1/02

See application file for complete search history.

(56) References Cited

U.S. PATENT DOCUMENTS

| | | | | |
|---|---|---|---|---|
| 2010/0039645 A1* | 2/2010 | Ajay | .................... | G08B 29/043 356/341 |
| 2012/0130545 A1* | 5/2012 | Haugh | .................... | G06F 1/203 700/276 |
| 2017/0022807 A1* | 1/2017 | Dursun | .................... | E21B 49/08 |
| 2019/0203628 A1* | 7/2019 | Su | .......................... | F01N 3/023 |

FOREIGN PATENT DOCUMENTS

| | | | |
|---|---|---|---|
| WO | WO-2008083138 A1 * | 7/2008 | ........... G01N 1/2211 |

* cited by examiner

*Primary Examiner* — David Z Huang
(74) *Attorney, Agent, or Firm* — Capitol City TechLaw; Jasbir Singh

(57) ABSTRACT

A device inspection apparatus includes an enclosure for holding a device while air is blown through it. The air flow enters through an enclosure intake, passes through the device, and exits past a particulate sensor. The sensor provides a level of particulates in the air flow. This value is used to determine if the device requires cleaning. This can reduce labor costs as only devices that need cleaning are opened. The device cleaning apparatus can be used for various devices with vents, such as set top boxes, desktop computers, and laptops.

20 Claims, 2 Drawing Sheets

DEVICE INSPECTION APPARATUS FOR DETERMINING CLEANING NECESSITY AND RELATED METHODS

FIELD

A device inspection apparatus includes an enclosure to hold a device while air flow is blown through the device past a particulate sensor. The particulate sensor provides a value derived from an amount of particulates in the air flow. Based on the particulate count/size blowing past the particulate sensor, a necessity of device cleaning is made. The device may be received at a recycling or remanufacturing facility in large quantities. These teachings are applicable to a variety of devices including, but not limited to, set top boxes, desktop computers, and laptops.

BACKGROUND

In the modern world, electronic devices are ubiquitous. These devices, ranging from set-top boxes to laptops, often rely on vents for their operation. However, the vents allow for contaminants from the environment in which they operate in to enter enclosures for the devices. Exemplary contaminants include dirt, dust, insects, cat urine or the like.

The traditional method of contamination involves physical inspection, which is not only labor-intensive but also prone to human error. This method is particularly inefficient when dealing with a large number of devices, as is often the case in manufacturing or recycling facilities that may intake thousands of devices per day. These devices need to be cleaned, when necessary, prior to being shipped to a user. At times up to 50% of devices may be received at the equipment facility requiring a cleaning. By only opening 50% of the received devices, significant labor savings can be realized. Furthermore, the process of opening the device enclosure to check for contaminants can potentially lead to damage, especially in devices with delicate or complex structures.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a device inspection apparatus that includes an enclosure designed to hold a device while air flow is blown through the device. The air flow disperses particulates for observation by a particulate sensor that derives a value from the count and/or size of particulates leaving the device. The device may be designated for cleaning based on the value. The device may be received at a recycling or remanufacturing facility in large quantities. The teachings can help reduce the number of devices that need to be opened for cleaning prior to use by another user, thereby potentially reducing labor costs.

In some aspects, the techniques described herein relate to a method for inspecting a device, the method including: holding the device in an enclosure; blowing an air flow into the enclosure and through the device to disperse particulates within the device into the air flow; and deriving a level of the particulates in the air flow with a particulate sensor positioned to observe the air flow.

In some aspects, the techniques described herein relate to a method, further including determining a necessity to clean the device by comparing the level of particulates to a predetermined level.

In some aspects, the techniques described herein relate to a method, further including cleaning the device based on the determined necessity.

In some aspects, the techniques described herein relate to a method, wherein the particulate sensor includes a plurality of particulate sensors and the method further includes aggregating each level from each of the plurality of particulate sensors to derive the level of the particulates in the air flow.

In some aspects, the techniques described herein relate to a method, further including managing the air flow with an air flow control valve.

In some aspects, the techniques described herein relate to a method, wherein the particulate sensor is disposed near an air flow exit.

In some aspects, the techniques described herein relate to a method, further including receiving the device at a recycling or remanufacturing facility.

In some aspects, the techniques described herein relate to a method, wherein the device is a set top box, a desktop computer, or a laptop.

In some aspects, the techniques described herein relate to a method, further including disposing the device on a platform including a slit prior to the blowing.

In some aspects, the techniques described herein relate to a method, wherein the particulate sensor includes a plurality of particulate sensors, one of the plurality of particulate sensors is disposed near the slit and one of the plurality of particulate sensors is disposed near an air flow exit.

In some aspects, the techniques described herein relate to an apparatus to inspect a device, the apparatus including: an enclosure configured to hold the device; an intake to blow an air flow into the enclosure and through the device to disperse particulates within the device into the air flow; and a particulate sensor positioned to observe the air flow and to derive a level of the particulates in the air flow after passing through the device.

In some aspects, the techniques described herein relate to an apparatus, further including a controller to determine a necessity to clean the device by comparing the level of particulates to a predetermined level.

In some aspects, the techniques described herein relate to an apparatus, wherein the controller indicates cleaning of the device based on the necessity.

In some aspects, the techniques described herein relate to an apparatus, wherein the particulate sensor includes a plurality of particulate sensors and the controller aggregates each level from each of the plurality of particulate sensors to derive the level of the particulates in the air flow.

In some aspects, the techniques described herein relate to an apparatus, further including an air flow control valve wherein the controller manages the air flow control valve.

In some aspects, the techniques described herein relate to an apparatus, wherein the device is received at a recycling or remanufacturing facility.

In some aspects, the techniques described herein relate to an apparatus, wherein the device is a set top box, a desktop computer, or a laptop.

In some aspects, the techniques described herein relate to an apparatus, wherein the particulate sensor is disposed near an air flow exit.

In some aspects, the techniques described herein relate to an apparatus, further including a platform including a slit, wherein the device is disposed on the platform over the slit.

In some aspects, the techniques described herein relate to an apparatus, wherein the particulate sensor includes a plurality of particulate sensors, one of the plurality of particulate sensors is disposed near the slit and one of the plurality of particulate sensors is disposed near an air flow exit.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
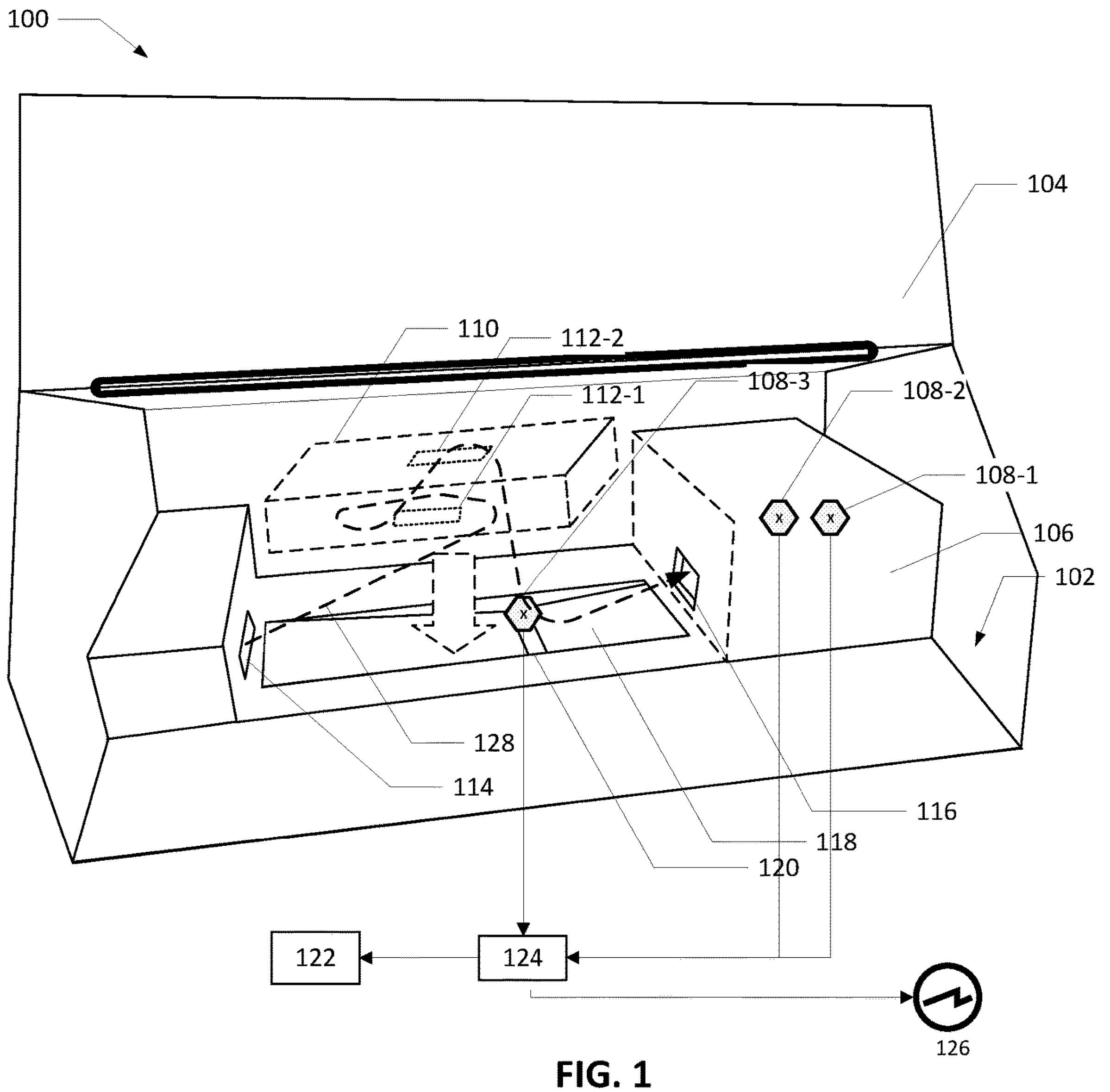
FIG. 1 is a schematic diagram of the device inspection apparatus according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 is a schematic diagram of the device inspection apparatus according to various embodiments.

FIG. 1 illustrates a device inspection apparatus 100. Device inspection apparatus 100 may include an enclosure 102, a door 104, an exit housing 106, particulate sensors 108 (particulate sensor 108-1, particulate sensor 108-2, particulate sensor 108-3), an air flow intake 114, an air flow exit 116, a platform 118, a split 120, an air flow control valve 122, a controller 124 and an indicator 126.

Enclosure 102 is designed to hold a device 110 that needs to be inspected. In some embodiments, enclosure 102 is sealed or partially sealed by closing door 104. Device 110 could be any device that includes vents 112 (vent 112-1, vent 112-2), such as a set top box, a desktop computer, or a laptop. Device 110 may be disposed on platform 118 over split 120 inside enclosure 102 while the inspection is taking place. Vents 112 may be disposed on one or more outer surfaces of device 110. Vents 112 may be used for passive cooling or forced cooling. In some embodiments, one of the vents may be aligned with air flow intake 114. In some embodiments, one of the vents 112 may be aligned with air flow exit 116. In some embodiments, one of the vents may be aligned with split 120. In some embodiments, vents 112 may be only one vent.

Controller 124 may control air flow control valve 122 to generate and manage air flow 128. Air flow control valve 122 may be connected to a high-pressure and/or high-volume air compressor (not shown). By opening air flow control valve 122, air flow 128 is blown into enclosure 102 via air flow intake 114 through device 110 and out through exit housing 106. Air flow 128 displaces particulates (not shown) within device 110 such that the particulates leave device 110 and are dispersed in air flow 128. Air flow 128 leaves device inspection apparatus 100 through one or more exits. Exemplary air flow exits include exit housing 106 and split 120. After exiting device inspection apparatus 100, air flow 128 may be filtered prior to being released into the environment.

Particulate sensors 108 are positioned to observe air flow 128 as it leaves device 110 and/or enclosure 102. Particulate sensors 108 observe particulates in air flow 128 and convert it to readings/values for use by controller 124. Information from particulate sensors 108 is used by controller 124 to derive a level of the particulates in air flow 128 after air flow 128 has passed through device 110. In some cases, there may be multiple particulate sensors 108, and their readings are aggregated to derive the level of particulates in the air flow. This level is then compared to a predetermined level to determine whether a cleaning of device 110 is necessitated. Controller 124 may indicate the cleaning necessity with indicator 126. Indicator 126 may be an light, a readout, an alarm or the like.

Positioning of particulate sensors 108 near air flow exit 116 and/or split 120 is strategic as it allows particulate sensors 108 to effectively measure/observe the particulates in air flow 128. In some embodiments, particulate sensors 108 may be disposed in air flow 128. In some embodiments, particulate sensors 108 may be disposed such as to not disturb air flow 128.

Air flow control valve 122 is responsible for managing air flow 128 within enclosure where the device is held for inspection. Air flow control valve 122 ensures that the air is blown into enclosure 102 and through the device in a controlled manner, facilitating the dispersion of particulates within the device into the air flow.

Device 110 may be received at a facility and determining their need for cleaning based on the level of particulates detected by the particulate sensor. Device inspection apparatus 100 may be used at a recycling or remanufacturing facility, where it can help to reduce labor costs by reducing the number of devices that need to be opened for cleaning.

Figure 2:
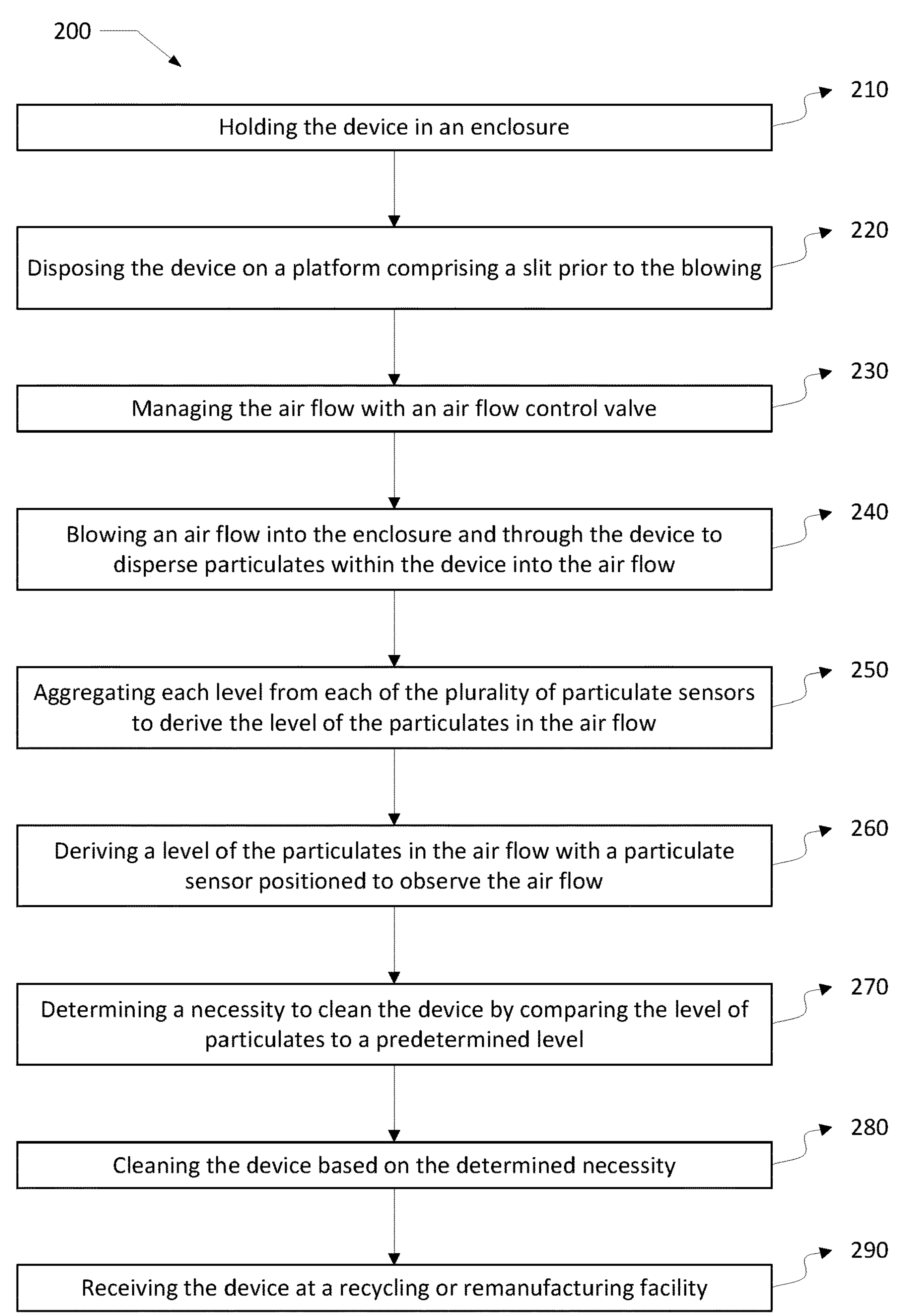
FIG. 2 is a flowchart of the method for inspecting a device according to various embodiments.

FIG. 2 is a flowchart of a method for inspecting a device according to various embodiments.

FIG. 2 is a flowchart of an example method 200 for inspecting a device. At step 210, the method 200 may include holding the device in an enclosure. At step 220, the method 200 may include disposing the device on a platform comprising a slit prior to the blowing. At step 230, the method 200 may include managing the air flow with an air flow control valve. At step 240, the method 200 may include blowing an air flow into the enclosure and through the device to disperse particulates within the device into the air flow. At step 250, the method 200 may include aggregating each level from each of the plurality of particulate sensors to derive the level of the particulates in the air flow. At step 260, the method 200 may include deriving a level of the particulates in the air flow with a particulate sensor positioned to observe the air flow. At step 270, the method 200 may include determining a necessity to clean the device by comparing the level of particulates to a predetermined level. At step 280, the method 200 may include cleaning the device based on the determined necessity. At step 290, the method 200 may include receiving the device at a recycling or remanufacturing facility.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for inspecting a device, the method comprising:

holding the device in an enclosure;

blowing an air flow into the enclosure and through the device to disperse particulates within the device into the air flow; and deriving a level of the particulates in the air flow with a particulate sensor positioned to observe the air flow, wherein the device comprises an intake vent and an exit vent, wherein the enclosure is aligned to direct the air flow through the intake vent of the device, wherein the air flow exits the device through the exit vent, and wherein the particulate sensor observes the air flow after the air flow exits the device through the exit vent.

2. The method of claim 1, further comprising determining a necessity to clean the device by comparing the level of particulates to a predetermined level.

3. The method of claim 2, further comprising cleaning the device based on the determined necessity.

4. The method of claim 2, wherein the particulate sensor comprises a plurality of particulate sensors and the method further comprises aggregating each level from each of the plurality of particulate sensors to derive the level of the particulates in the air flow.

5. The method of claim 2, further comprising managing the air flow with an air flow control valve.

6. The method of claim 1, wherein the particulate sensor is disposed to observe the air flow exit the enclosure.

7. The method of claim 1, further comprising receiving the device at a recycling or remanufacturing facility.

8. The method of claim 1, wherein the device is a set top box, a desktop computer, or a laptop.

9. The method of claim 1, further comprising disposing the device on a platform comprising a slit prior to the blowing, wherein the disposing aligns the exit vent with the slit.

10. The method of claim 9, wherein the particulate sensor comprises a plurality of particulate sensors, and wherein one of the plurality of particulate sensors is disposed to observe the air flow exit the slit.

11. An apparatus to inspect a device, the apparatus comprising:

an enclosure configured to hold the device;

an intake to blow an air flow into the enclosure and through the device to disperse particulates within the device into the air flow; and a particulate sensor positioned to observe the air flow and to derive a level of the particulates in the air flow after passing through the device, wherein the device comprises an intake vent and an exit vent, wherein the enclosure is aligned to direct the air flow through the intake vent of the device, wherein the air flow exits the device through the exit vent, and wherein the particulate sensor observes the air flow after the air flow exits the device through the exit vent.

12. The apparatus of claim 11, further comprising a controller to determine a necessity to clean the device by comparing the level of particulates to a predetermined level.

13. The apparatus of claim 12, wherein the controller indicates cleaning of the device based on the necessity.

14. The apparatus of claim 12, wherein the particulate sensor comprises a plurality of particulate sensors and the controller aggregates each level from each of the plurality of particulate sensors to derive the level of the particulates in the air flow.

15. The apparatus of claim 12, further comprising an air flow control valve wherein the controller manages the air flow control valve.

16. The apparatus of claim 11, wherein the apparatus is located at a recycling or remanufacturing facility.

17. The apparatus of claim 11, wherein the device is a set top box, a desktop computer, or a laptop.

18. The apparatus of claim 11, wherein the particulate sensor is disposed to observe the air flow exit the enclosure.

19. The apparatus of claim 11, further comprising a platform comprising a slit, wherein the device is disposed on the platform with the exit vent aligned with the slit.

20. The apparatus of claim 19, wherein the particulate sensor comprises a plurality of particulate sensors, and wherein one of the plurality of particulate sensors is disposed to observe the air flow exit the slit.

* * * * *